July 16, 1929.  D. C. ADDICKS  1,721,289
DISINTEGRATING MACHINE
Filed April 8, 1927

Diedrich C. Addicks INVENTOR

BY

H. G. Burns ATTORNEY

Patented July 16, 1929.

1,721,289

UNITED STATES PATENT OFFICE.

DIEDRICH C. ADDICKS, OF ROCKMART, GEORGIA.

DISINTEGRATING MACHINE.

Application filed April 8, 1927. Serial No. 181,942.

This invention relates to improvements in disintegrating machines of that type wherein a rotor, having a series of pivoted hammers, is used in conjunction with a breaker plate and a series of cage bars disposed in a housing. The invention pertains particularly to the cage bars and the manner in which the bars are mounted in the housing, so as to be adjustable, and also to the arrangement of the bars in conjunction with mechanism for imparting rocking movement thereto.

The object of the invention is to provide in a machine of its class a construction such as will admit ready removal and replacement of the cage bars, as when renewals are required. Another object is to provide a simple means by which the cage bars are collectively adjusted to compensate for the wear of the cage bars. And a further object is to provide an expedient in conjunction with the cage bars whereby the cage bars are caused to rock continuously upon their respective longitudinal axes during the operation of the machine, to thereby facilitate the disintegrating operation of the machine and to obviate "binding" of the spaces between the cage bars.

These objects are accomplished by the construction illustrated in the accompanying drawings, in which:—

The characters appearing in the description refer to parts shown in the drawings and designated thereon by corresponding characters.

Figure 1:
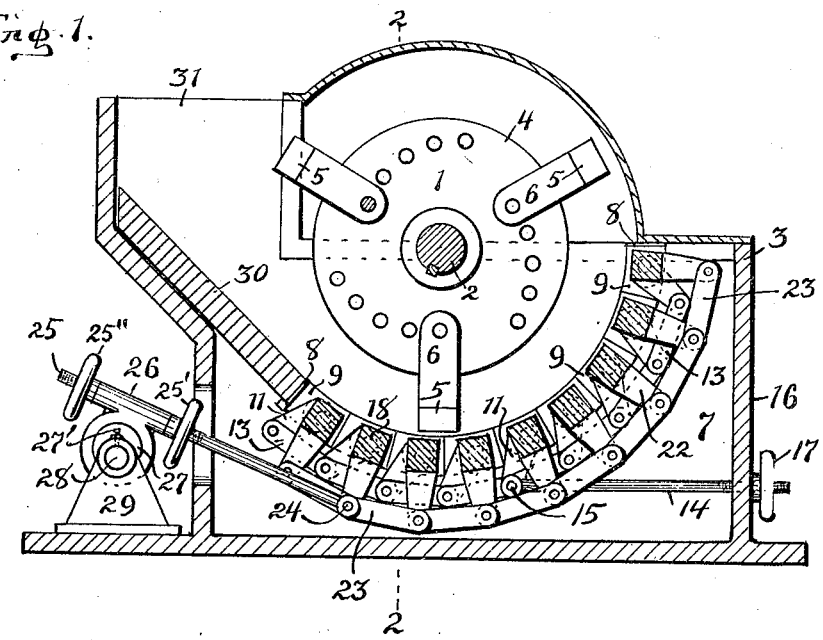
Fig. 1 is a vertical section of a machine embodying the invention.
Figure 2:
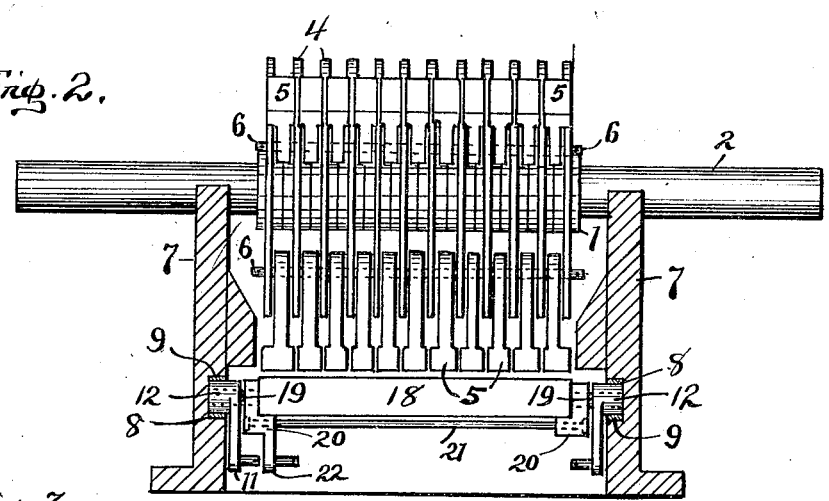
Fig. 2 is a vertical section of Fig. 1 on the line 2—2 thereof, parts being omitted.
Figure 3:
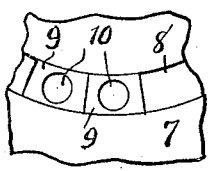
Fig. 3 is a fragmentary view showing the arrangement of the bearing blocks in the wall of the housing for supporting the cage bar mechanism.

The invention comprises a rotor 1 mounted upon a driveshaft 2 which extends horizontally through a housing 3. The rotor is of usual construction consisting of a series of discs 4 spaced apart and mounted concentrically upon the drive shaft so as to gyrate numerous hammers 5 that are arranged in groups, the hammers of each group being secured upon a corresponding rod 6 that extends laterally through the series of discs.

Each end wall 7 of the housing has made therein a recess 8 in the form of an arc that is disposed concentric with the drive-shaft 2 and has removably positioned therein a series of bearing blocks 9, each having an opening 10 therein, the blocks being arranged in successive order from one end of the recess to the other. In each block is mounted a crank 11, the hub 12 of the crank being positioned in the opening 10 in the corresponding block so as to turn therein. The outer ends of the cranks 11 of each series are connected with a corresponding series of links 13, and one of said cranks has in connection therewith an adjusting rod 14, the rod being connected on the pin 15 of said crank. The opposite end of the adjusting rod 14 is threaded and extends through the back wall 16 of the housing and has thereon an adjusting wheel 17 by which the rod is adjusted longitudinally and said cranks collectively moved accordingly.

A series of cage bars 18 is arranged in supported relation with said cranks, there being a trunnion 19 extending from each end of each bar 18 into the hub 12 of the corresponding crank 11 at a point eccentric thereto, so that when said cranks are adjustably moved, the cage-bars will be collectively moved toward or away from the rotor accordingly. Each bar has also on each of its trunnions a dog 20, which dogs are connected together by a tie-rod 21 so that said bar is clamped endwise between the dogs. One of the dogs on each bar has a crank arm 22 that has connected relation with the crank arms of the other bars by means of connecting links 23, and the pin 24 of one of the crank arms 22 has connection with one end of an actuating rod 25. The opposite end of said actuating rod is adjustably secured in a gyrating member 26 that is mounted upon an eccentric 27, there being a shaft 28 rotatably mounted in a stand 29, upon which shaft the eccentric is mounted. Upon rotation of the shaft rocking movement is imparted simultaneously to the cage bars.

Positioned in the housing, at a point in advance of the series of cage bars is a breaker plate 30 of the usual type, over which the material to be crushed passes into the path of the hammers.

In the operation of the invention continuous rotary motion is imparted to the shafts 2 and 28 by any suitable source of power so that the rotor is revolved, and the cage bars are collectively oscillated. The material to be distintegrated is introduced into the hopper 31 onto the breaker plate 30, from which plate the material passes into contact with the hammers and is thereby crushed and impinged against the cage bars. Such particles of the crushed material as have been reduced sufficiently, pass between the cage bars and are discharged. The continuous rocking movement of the cage bars has the effect of facilitating the passage of the crushed material between the bars, and furthermore augments the disintegrating operation of the hammers.

When it is desired, the shaft 28 may be locked so as not to rotate, there being a set-screw 27' provided in the stand for that purpose, in which event the cage-bars will be held stationary, except that they may be adjustably turned upon their axes collectively in one direction or the other by manipulating the hand wheels 25' and 25'' on the actuating rod.

An especial feature of the invention consists in the manner in which the cage-bars are mounted and secured in connection with the actuating mechanism therefor: Each cage-bar is substantially square in cross-section, and is clamped endwise between the dogs 20 which are so formed as to prevent relative turning movement of the bar and dogs. As the faces of the bars that are exposed to the grinding action of the rotor become worn, the bars may be repositioned in connection with their respective dogs so as to present other of their faces toward the rotor. By adjustably tilting the bars one edge or the other of their exposed faces is moved toward the path of the hammers according to the direction in which the bars are tilted, and said bars are also moved bodily toward the path of the hammers by adjustably moving the cranks.

What I claim is:—

1. A disintegrating machine including a rotor; a housing enclosing the rotor, each end wall of the housing having formed therein an arc-shaped recess concentric with the axis of the rotor; a series of bearing blocks removably positioned in each of said recesses; a crank in connection with each of said blocks having turning movement therein; a series of links connecting the arms of the cranks of each series; means for adjustably turning said cranks; a series of spaced cage bars, each being supported by a corresponding pair of said cranks there being a trunnion extending from each end of said bar into the hub of the corresponding crank at a point eccentric thereto; a member detachably fixed on each bar including an arm; a series of links connecting the arms of said bars; a breaker plate in the housing adjacent said series of bars; and a mechanism for imparting rocking movement to said bars.

2. In a disintegrating machine including a housing and rotor therein, a breaker member in the housing co-operable with the rotor; a series of spaced cage bars positioned in the housing in arc formation about the rotor; an adjustable mechanism including a series of rocking members for supporting said cage-bars; means whereby said members are actuated collectively to move said bars toward or from said rotor; and a mechanism in connection with said cage bars operable to impart rocking movement to said bars.

3. A disintegrating machine including a housing, a rotor in said housing; a breaker member co-operative with said rotor; a series of spaced cage-bars disposed in arched formation adjacent said rotor; supporting members in said housing, one pair for each of said bars, each member being disposed upon an individual axis; a mechanism for continuously rocking said bars; and means for collectively adjusting said members.

4. In combination with a rotor, breaker member and housing therefor; rockable supports disposed in pairs in said housing; a series of spaced cage-bars sustained by the corresponding supports in arched formation adjacent the rotor, said bars having continuous rocking movement upon their respective longitudinal axes; and mechanism related with said rockable supports for collective adjustment thereof.

5. In combination with a rotor and breaker, an arched series of rockable supporting members arranged in pairs oppositely disposed; a corresponding series of rockable grate-bars supported in eccentric relation with said members; means for adjustably rocking said members; and mechanism for actuating said grate bars.

In testimony whereof I affix my signature.

DIEDRICH C. ADDICKS.